United States Patent [19]

Mineur

[11] 4,208,032
[45] Jun. 17, 1980

[54] CLOSING DEVICE WITH VALVE HAVING A HIGH SPEED REACTION

[75] Inventor: Andre Mineur, Marly, France

[73] Assignee: Mineur-Becourt SA, Marly les Valenciennes, France

[21] Appl. No.: 853,176

[22] Filed: Nov. 21, 1977

[30] Foreign Application Priority Data

Nov. 18, 1977 [FR] France .................. 76 35589

[51] Int. Cl.² .................. F16K 31/44; F16K 35/00
[52] U.S. Cl. .................. 251/69; 137/384.6; 137/384.8
[58] Field of Search .................. 251/68, 69, 75; 137/384.6, 384.8

[56] References Cited

U.S. PATENT DOCUMENTS

| 998,507 | 7/1911 | Hasty | 251/68 |
|---|---|---|---|
| 1,183,815 | 5/1916 | Hasty | 251/68 |
| 1,372,063 | 3/1921 | Carruth | 137/384.6 |
| 2,276,195 | 3/1942 | Holmes | 251/69 |
| 3,082,627 | 3/1963 | Yeo et al. | 251/67 |
| 3,315,939 | 4/1967 | Boone et al. | 251/69 |
| 3,685,791 | 8/1972 | Czuszak et al. | 251/69 |
| 3,802,459 | 4/1974 | Geraudie | 137/384.6 |

FOREIGN PATENT DOCUMENTS 549910 12/1942 United Kingdom ............ 251/69

Primary Examiner—Martin P. Schwadron
Assistant Examiner—A. Michael Chambers
Attorney, Agent, or Firm—Spensley, Horn, Jubas & Lubitz

[57] ABSTRACT

A closing device with a valve having a high speed reaction. A dome shaped valve is forced open by applying pressure to a piston which is attached to the dome. The opening pressure is provided by an electromagnetic jack and is transmitted through a lock which has a releasing threshhold. The displacement of the piston biases a return spring into a compressed state. Force applied to the lock by a solenoid counteracts the force of the return spring so as to keep the lock locked and thus keep the dome open. When enough force is applied to the dome so as to overcome the threshhold of the lock, or if the lock is intentionally released, the piston is freed and the return spring quickly forces the dome to a closed position.

6 Claims, 6 Drawing Figures

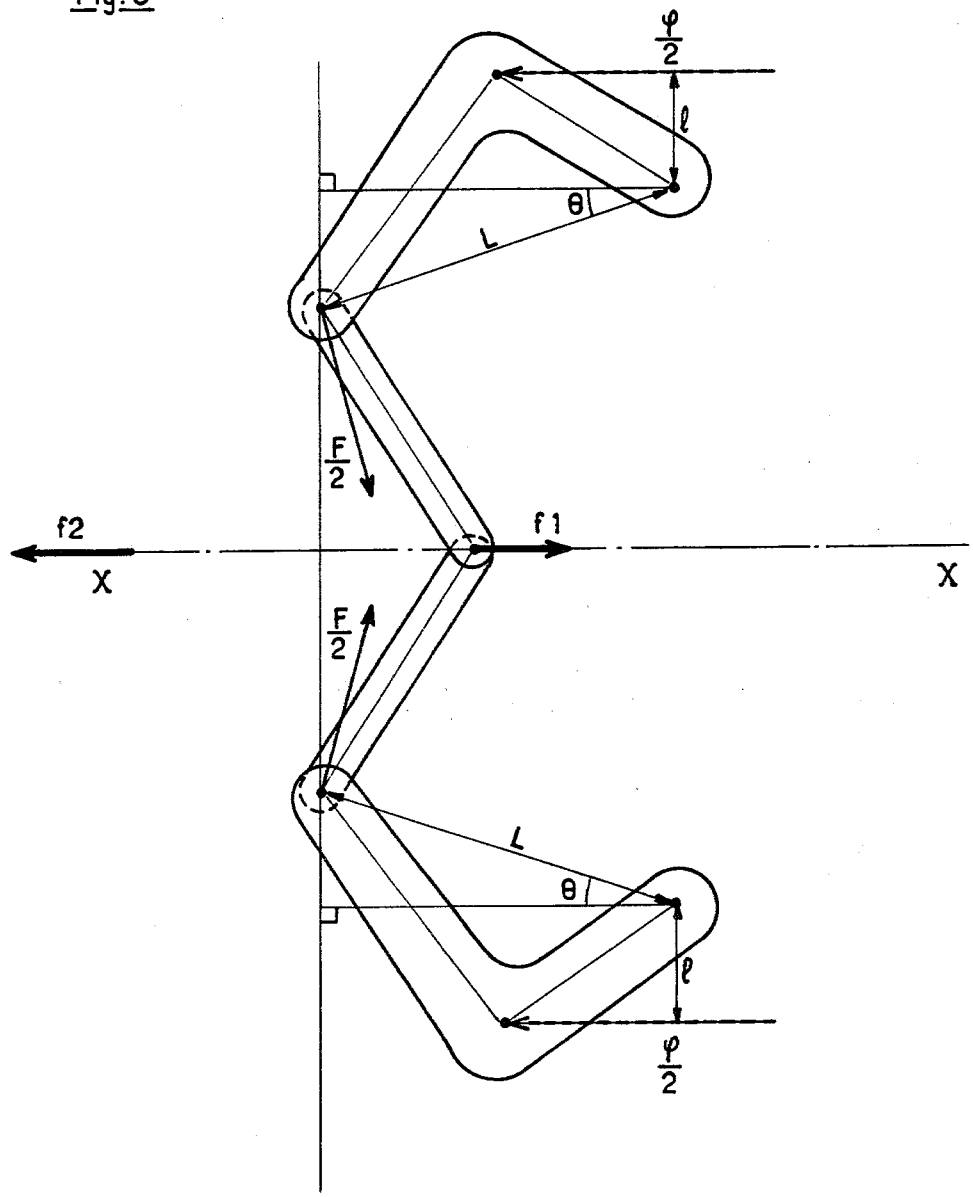
Fig:6

CLOSING DEVICE WITH VALVE HAVING A HIGH SPEED REACTION

BACKGROUND OF THE INVENTION

The present invention provides a closing device with a valve having a high speed reaction designed to close openings, in particular openings in ventilating installations having a great delivery.

In some ventilation systems which have a great delivery, it is necessary to equip them with closing devices which have very short reaction times. Quick and efficient closing of the openings of ventilating installations is required so as to protect the installation against any outside pollution resulting, for example, from an explosion. Also, it is advantageous to be able to quickly open the closing devices so as to feed in non-polluted air to the installation when conditions are good.

The present invention is directed to a closing device with a valve having a high speed reaction in which the closing operation can be performed either automatically or in a manually operated manner so as to close ventilating mouths, waste diesel gas mouths or vitiated air mouths.

It is another purpose of the closing device to prevent over-pressure from penetrating inside ducts or buildings during an explosion of any type.

It is another purpose of the present invention to achieve a closing device capable of quickly reopening as soon as over-pressures are stopped in order to prevent the ventilating or diesel engine groups from stopping.

SUMMARY OF THE INVENTION

The above purposes and others are achieved by the present invention, which provides a closing device with a valve having a high speed reaction to close openings, in particular in ventilating installations with great delivery. The device includes a fixed portion defining an opening and carrying a seat, and a dome shaped valve closing on the seat. The dome is brought from an open position to a closed position by a return means which includes a driving element integral with the dome and acting upon a middle element connected to the dome by a driving means capable to cause relative motion between the middle element with respect to the dome. The middle element is connected to a setting means through a lock which has a releasing threshhold. Pressure is applied by the setting means through the lock so as to displace the middle element and in turn force the driving element and dome into an open position. When the lock is released, either by an operator or automatically (if pressure on the dome causes the releasing threshhold of the lock to be exceeded) the return means will cause the dome to quickly close upon the seat.

The use of the closing device makes it possible to reach very high reaction speeds and a high rate of delivery. In order to cope with the high blowing speeds which are employed, the device has both a quick reaction time and a very fast closing speed.

The invention is further characterized in that the lock having a releasing threshhold consists of two small rods pivotally attached to a slide, each of the rods having a hinged cam attached to one end and forming the actual locking element of the lock.

The driving element of the invention consists of an abutment integral with an external piston which slides inside a housing that is integral with the fixed portion of the device. The return means causes the external piston to slide within the housing when the lock is in an unlocked position and forces the dome to its closed position.

The invention is further characterized in that the external piston carries a return lock which includes two pivoting cams cooperating with the middle element to engage the free edge of a tube which is integral with the fixed portion when the dome moves towards its closed position. The return lock prevents the external piston from changing its direction of motion and thus unintentionally reopening the dome (i.e., it locks the dome into its closed position).

The middle element includes an internal piston, one end of which carries a groove provided on its internal surface and which receives the cams of the threshhold lock, the piston having a cone shaped surface or shoulder near its other end which cooperates with an abutment of the external piston so as to make the latter integral with the internal piston when the dome is opening. The cone shaped shoulder or surface also acts upon the return lock so as to release it when the dome is opening.

The setting means of the invention includes a solenoid which operates to change the position of the cams of the threshhold lock so as to release the lock and cause the dome to move to its closed position.

BRIEF DESCRIPTION OF THE DRAWINGS

The invention will be better understood by reference to the attached drawings, wherein:

FIG. 6 is a sketch showing the forces exerted on the cams of the threshhold lock.

DETAILED DESCRIPTION OF THE DRAWINGS

Figure 1:
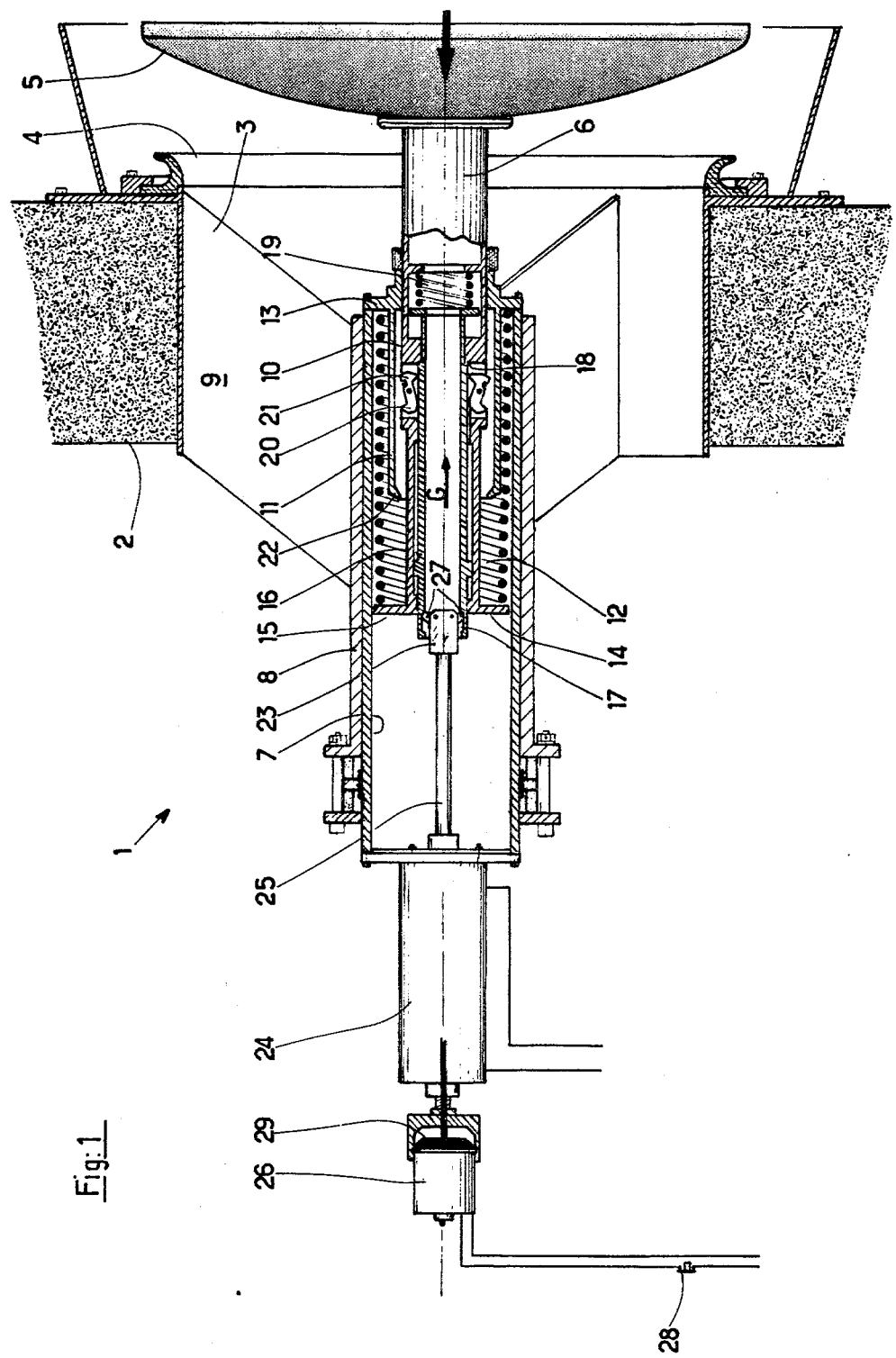
FIG. 1 is a part cross section side view of the closing device shown in its opened position.
Figure 2:
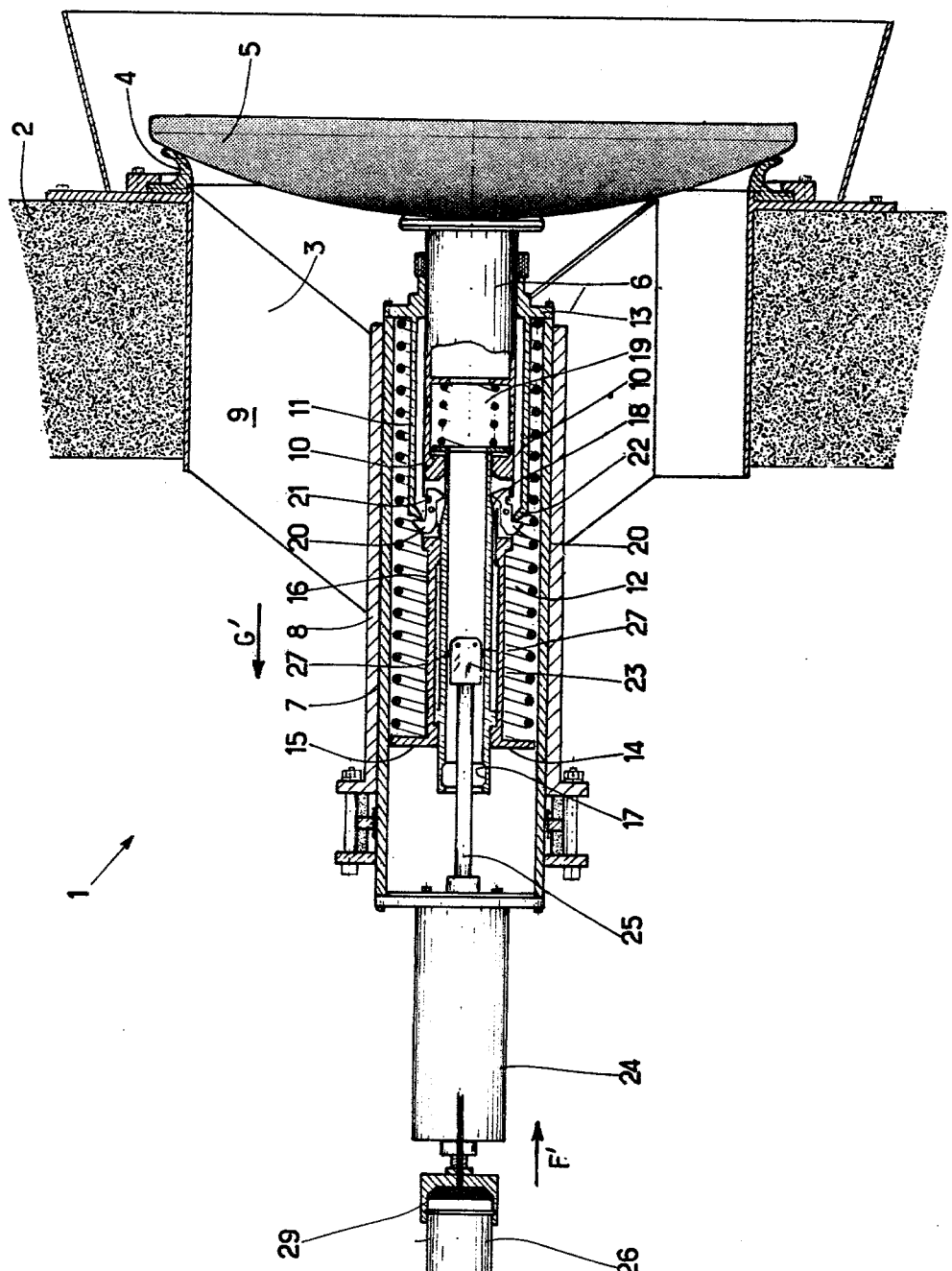
FIG. 2 is a part cross section side view of the closing device shown in its closed position.
Figure 3:
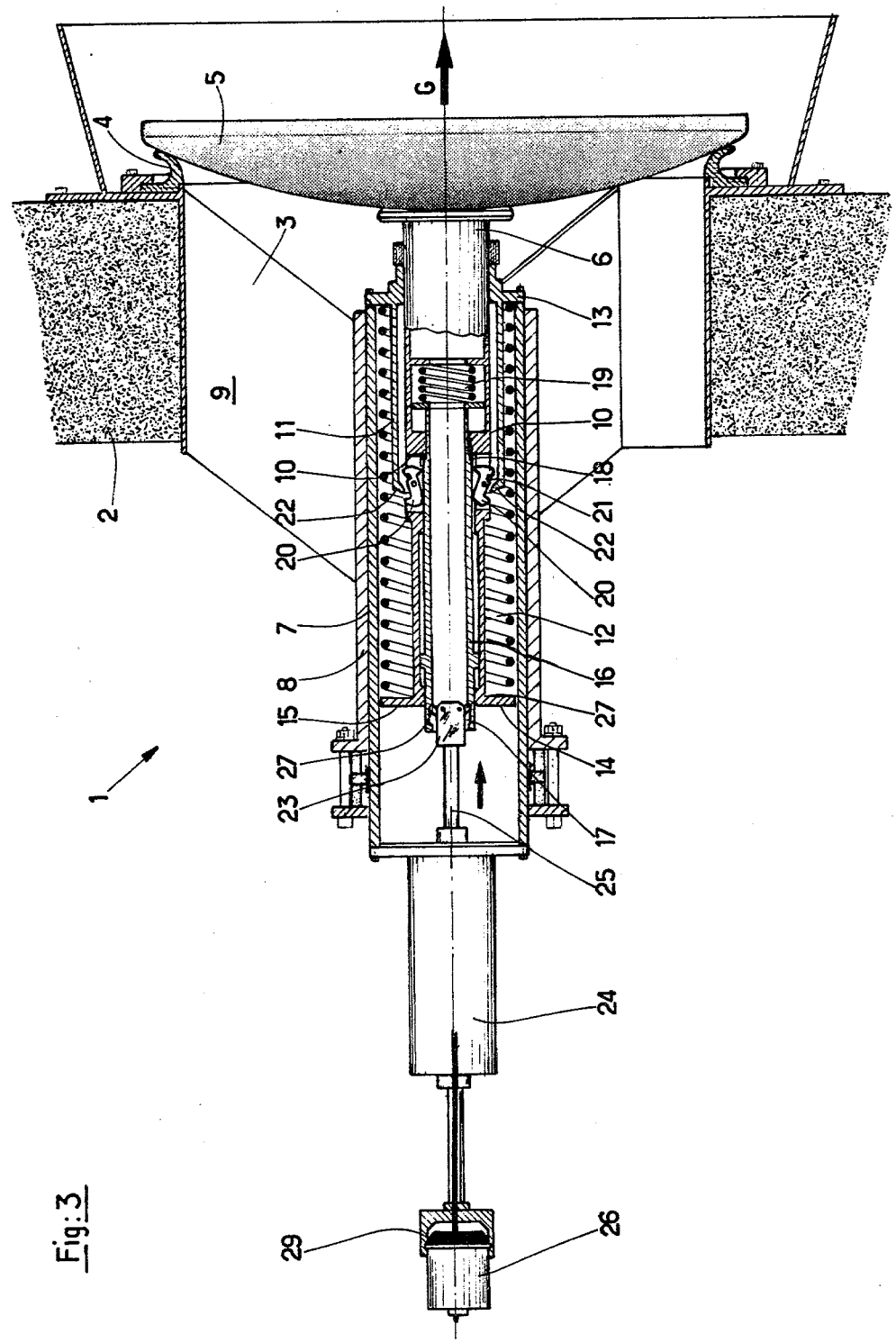
FIG. 3 is a part cross section side view of the closing device shown in the process of opening.

Referring to FIGS. 1, 2 and 3, the closing device 1 of the present invention includes a cylindrical portion 3 to which is attached a circular seat 4. The cylindrical portion 3 is mounted inside a wall 2 and provides an opening through the wall 2. A dome or cupola 5 operates as a valve and closes onto the seat 4. The center of the dome 5 is fitted to a rod 6 which is slidably mounted inside a housing 7 which is integral with the cylindrical portion 3. A tube 8 surrounds the housing 7 and includes a plurality of fins 9 extending from it to the wall of the cylindrical portion 3. An inner tube 11 is attached to the housing 7 via a member 13.

A spring 12 is utilized to provide a closing force to the dome 5. The spring 12 surrounds the tube 11 and has one end which contacts a ring 14 which is integral with an external piston 15. The piston 15, which includes a thrust abutment 10, is connected to the rod 6 and serves as a driving element for the opening and closing of the dome 5.

The abutment 10 of the piston 15 acts upon an internal piston 16, one end of which includes a groove 17.

The groove 17 is located on the internal face of the internal piston 16. A cone shaped surface or shoulder 18 is located near the opposite end of the piston 16. The internal piston 16 is positioned to slide within the external piston 15. A spring 19 is connected between the end of the rod 6 and one end of the piston 16.

A demultiplying lock 23 having a releasing threshhold (i.e., if too much force is applied to it it will automatically unlock) includes cam members 27 which are designed to fit into the groove 17 in the piston 16. The threshhold lock 23 is attached to and driven by a rod 25 whose opposite end is connected to a disc shaped moveable element 29. The rod 25 includes an outside portion 25a for causing displacement of the lock and an inside portion 25b (which is attached to the moveable element 29) for controlling the locking action of the lock 23. The rod 25 passes through a driving jack 24 which has one end connected to the housing 7. The design of the jack 24 is not critical, and it may be of a pneumatic, hydraulic or mechanical type. The basic requirement is simply to provide a means for moving the rod 25, which may be accomplished in many different ways. An electromagnetic sucker or solenoid 26 which acts upon the moveable element 29 is attached to the opposite end of the drive jack 24.

The external piston 15 carries pivoting cams 20 which are set in position on the external surface of the internal piston 16 by a resilient element 21. The cams 20 form a return lock and are capable of engaging through pivoting an inwardly extending edge 22 of the tube 11.

The operation of the closing device 1 is as follows:

First Phase: Open Position

As shown in FIG. 1, the dome 5 is in an open position. In this position, a switch 28 is closed so as to energize the solenoid 26. The solenoid 26 attracts the moveable element 29 which in turn causes displacement of the interior part of the rod 25. This brings the threshhold lock 23 into its locked position (i.e., the cam elements 27 engage the groove 17 of the internal piston 16). It is then possible to cause displacement of the rod 25 and thus the piston 16 along arrow G by operating the jack 24. The motion of the piston 16 will cause the spring 19 to be compressed. In addition, the shoulder 18 of the piston 16 will contact the abutment 10 of the piston 15, thus causing the piston 15 to also move and to compress the spring 12. In such a position, the pivoting cams 20 are pivoted backwards by the surface of the piston 16 so as to be released in relation to the edge 22. This allows the dome 5 to be brought to its fully open position. Therefore, under a fully open condition, both the spring 19 and the spring 15 are in their compressed states. In addition, the solenoid 26 and the driving jack 24 are being energized.

Second Phase: Closed Position

As shown in FIG. 2, the closing device 1 is brought to its closed position. This position is obtained by removing power from the solenoid 26 which releases the moveable member 29 which in turn causes the cam members 27 to be disengaged from the groove 17. The disengaging of the cams 27 releases the spring 12 which causes displacement of the external piston 15 along an arrow G'. In addition, the spring 19 is released and it causes additional displacement of the internal piston 16 along the arrow G', thus generating relative motion of the internal piston 16 with respect to the dome 5. During the motion of the internal piston 16, the cams 21 will swing outwardly when they contact the shoulder 18 of the internal piston 16. The swinging of the cams 20 causes them to engage the edge 22 of the tube 11 and lock the dome 5 into its fully closed position. This prevents any "backlash" due to the action of the spring 12 when it closes the dome 5, i.e., it prevents any tendency of the dome 5 to spring back open after it closes.

In summary, when power is removed from the solenoid 26, the threshold lock 23 is released and its cams 27 disengage from the groove 17. The compressed springs 12 and 19 are thereby released, causing relative motions of the internal piston 16 and the external piston 15 along the arrow G'. The cams 20 cooperating with the external surface of the internal cylinder 16 serve to clamp the dome 5 into its fully closed position by engagement with the edge 22 of the tube 11.

Third Phase: Reopening Position

Figure 4:
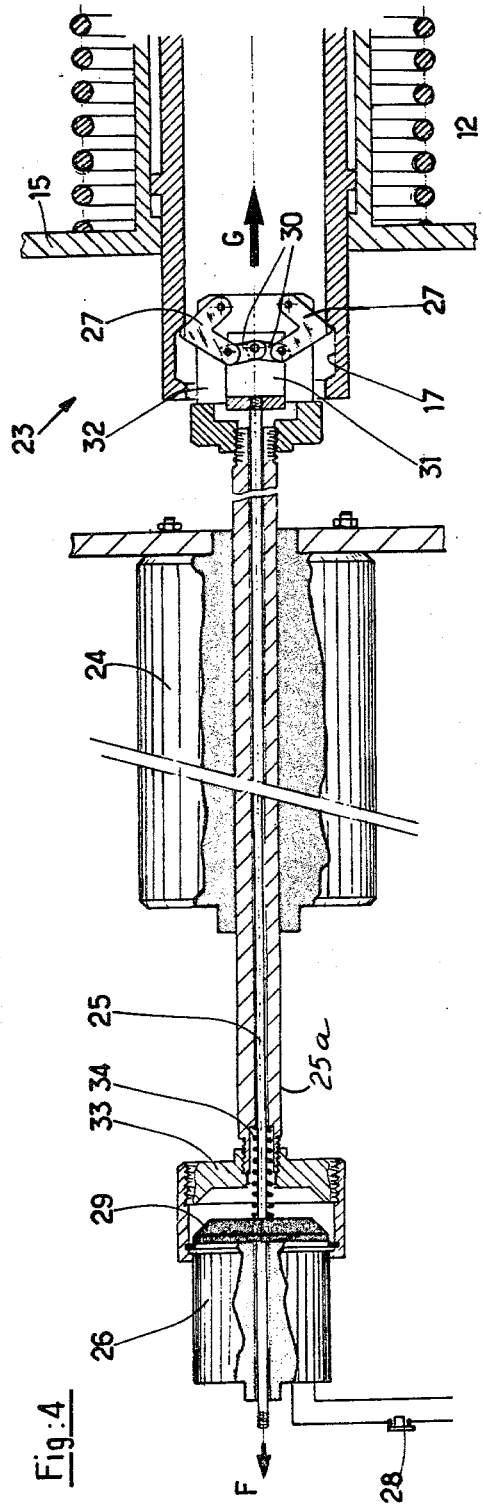
FIG. 4 is a part cross section side view of the threshhold lock in its locked position.
Figure 5:
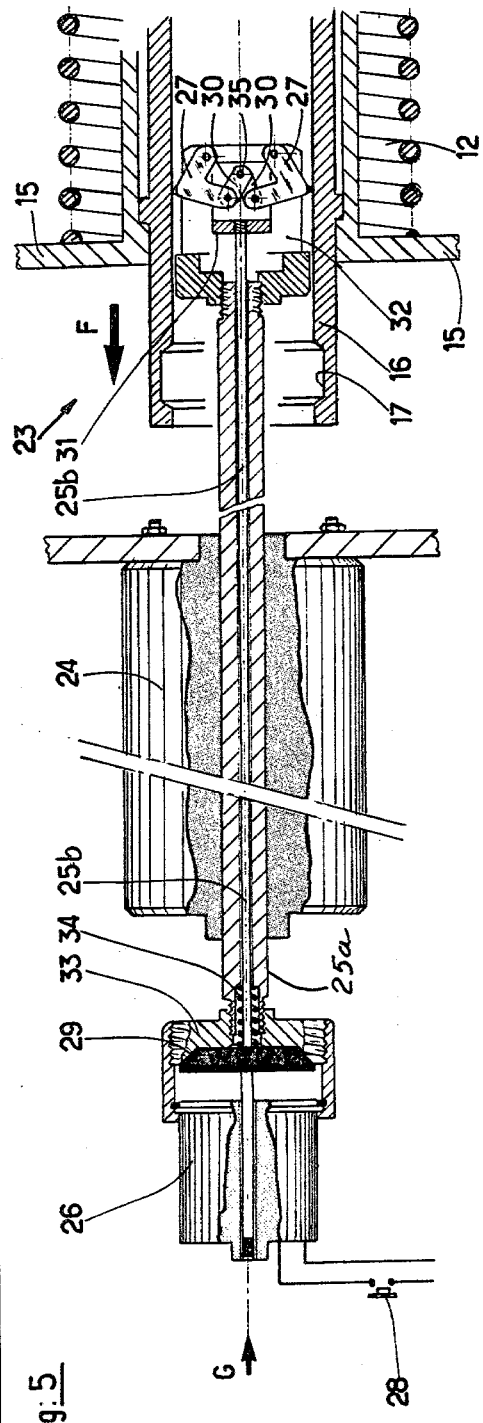
FIG. 5 is a part cross section side view of the threshhold lock in its unlocked position.

Referring to FIG. 3, the closing device 1 is shown in its closed position at the beginning of a reopening phase. In this position, the solenoid 26 is fed which operates the displacement of the moveable element 29 acting on the rod 25 and the lock 23. The lock 23 is brought through a displacement along an arrow F (as shown in FIGS. 4 and 5) to a level with the groove 17 of the internal piston 16. At that point, the cams 27 will engage the groove 17 and the internal piston 16 will be displaced along arrow G by means of the jack 24. In such a position, the shoulder 18 of the internal piston 16 will force against the abutment 10 of the external piston 15, thus causing the internal piston 16 and external piston 15 to move integrally. By displacing the rod 25 along arrow G, both the spring 12 and the spring 19 are compressed and the closing device will be in a position corresponding to that shown in FIG. 1.

Referring now to FIGS. 4 and 5, the threshhold lock 23 is represented with more details. The lock 23 includes a moveable set operated by the solenoid 26. The moveable set consists of two small rods 30 connected to one another on a slide 31. Each of the rods 30 is connected to one of the hinged cams 27 which extend outwardly from the rods 30. The slide 31 is connected to the internal portion of connecting rod 25, and its movement causes the pivoting of the rods 30 which in turn cause the cams 27 to be moved into either a locking position or a released position.

The slide 31 and the small rods 30, as well as the cams 27, are fitted inside a split cylinder 32 capable of sliding within the internal piston 16. The motion of the split cylinder 32 is controlled by the the jack 24 through the outer portion of the rod 25 and the motion of the cams 27 is controled by the solenoid 26 through the inner portion of the rod 25 and the slide 31. As previously described, the operation of the solenoid 26 and the action of the jack 24 determines the relative motion of the internal piston 16 with respect to the external piston 15. The solenoid 26 operates on the moveable element 29, which is biased towards a seat 33 by means of a tension spring 34 when the solenoid 26 is not fed.

The threshhold lock 23 operates as follows:

First Phase: Locked Position

As shown in FIG. 4, the lock 23 is in its locked position. In this position, the solenoid 26 is energized, i.e., the switch 28 is closed. The action of the solenoid 26 attracts the moveable element 29 and thus the interior portion of the rod 25. The force applied by the tension spring 34 is insufficient to hold the moveable element 29 in its seat 33 when the solenoid 26 is energized. The displacement of the rod 25 along the arrow F operates the withdrawal of the slide 31 on which the small rods 30 are mounted. The motion of the rods 30 determines the outward extension of the cams 27. When the cams 27 engage the groove 17, it is possible to operate the displacement of the slide 31 along arrow G by means of the jack 24. This in turn moves the internal piston 16 and the external piston 15 against the effort of the springs 19 and 12. Thus, when the lock 23 is in its locked position, it is possible to open the dome 5. In such a position, the spring 12 exerts a force on the cams 27 through the external piston 15 and the internal piston 16. This force tends to make the slide 31 travel along the arrow G, but it is not so strong as to overcome the force exerted by the solenoid 26. The force exerted by the spring 12 onto the cams 27 will be explained subsequently. When in its locked position, the lock 23 makes it possible to set the external piston 15 and thus the dome 5 against the action of the spring 12.

Second Phase: Unlocked Position

As shown in FIG. 5, the lock 23 is brought to its unlocked position either by excess pressure exerted on the dome 5, or by turning off the solenoid 26. As shown in FIG. 5, the switch 28 is open. In such a case, the moveable element 29 is forced onto its seat 33 by the action of the tension spring 34. This forces the inner portion of the rod 25 along the arrow G, which causes displacement of the slide 31 and the split cylinder 32 along the arrow G inside the piston 16. The small rods 30 pivot about a pin 35 and the displacement of the slide 31 along the arrow G causes the rods 10 to come closer to the pin 35. This motion is translated to the cams 27 causing them to become disengaged from the groove 17 of the internal piston 16. As soon as this happens, the force of the spring 12 operates to displace the external piston 15 along the arrow F. This sudden motion causes the very quick closing of the dome 5.

Referring now to FIG. 6, the cams 27 are subjected, when the lock 23 is locked, to the force exerted by the spring 12. This force results in a force f1 along the arrow G of FIG. 4. A greater force f2 is exerted by the solenoid 26 so as to counteract the force f1 and keep the lock 23 in its locked position.

As shown in FIG. 6, the axis of symmetry X of the device has been chosen so that a force $\phi$ exerted by the spring 12 is equal to $\phi/2$ for each cam 27. The force $\phi/2$ may be expressed as a function of a force F/2 perpendicular to a line L by the equation: $\phi/2 \cdot l = F/2 \cdot L$. Therefore, F/2 equals $\phi l/2L$ (where l and L are the lengths of lever arms). The force F/2 has a component f1/2 directed along the axis X. These two forces result in a force f1.

The force f1 is a fraction of the force $\phi$ and tends to open the cams 27. This force is counterbalanced by the force f2 exerted by the solenoid 26. In order to keep the lock 23 in its locked position, the force f2 must be greater than the force f1. The releasing threshhold or sensitivity required to release the lock 23 is determined by the difference between f1 and f2. Therefore, the more one tends to balance both forces f1 and f2, the greater is the sensitivity of the lock 23. It should be noted that as an angle $\theta$ between the line L and a line perpendicular to the axis X becomes smaller, the component f1 of the force $\phi$ becomes weaker.

In summary, disclosed is a closing device with a having a high speed reaction to close openings, in particular openings in ventilation installations having a great delivery. The closing device comprises a fixed portion or frame 3 carrying a seat 4 and a dome 5 constituting the valve and closing onto the seat 4. The dome 5 is brought from an open position to a closed position by a return means (the spring 12). A drive element or member (the abutment 10 integral with the piston 15) actuates a middle element (the internal piston 16) which is connected to the dome 5 by a driving means (the spring 19) capable to operate a relative motion of the middle element in relation to the dome 5. The middle element is also connected to a setting means (the solenoid 26) through a threshhold lock (the lock 23). The effort exerted by the return means is transmitted by the driving element towards the middle element which in turn transmits the effort to the setting means through the threshhold lock. The lock includes a moveable set (the small rods 30) operated by the setting means and connected to a pair of hinged cams 27 which constitute the locking element of the lock. The rods 30 are connected to one another by a holding means (the pin 35 and the slide 31) which determines the releasing threshhold and operates the release of the cams 27. The device includes a return lock (the cams 20) which cooperate with the middle element so as to engage the free edge of a tube integral with the fixed portion when the dome is moving to its closed position.

It should be understood that the invention is not limited to the modes of embodiment disclosed and depicted, and that other variants can be provided without departing from the scope of the invention.

What I claim is:

1. A high speed closing device, comprising;
   a frame defining an opening;
   a valve which longitudinally closes upon said frame;
   a housing secured to said frame within said opening;
   a hollow external piston, integral with said valve and slidable within the housing;
   a first spring located between the external piston and the housing for applying a closing force to the external piston to close the valve;
   a coaxial sleeve surrounding a first rod, said first rod slidable within the coaxial sleeve,
   and coupling lock means connected to the first rod for selectively coupling the first rod to the external piston when the rod is in a first position;
   means for connecting the external piston to the coupling lock means;
   first means for moving the first rod to the first position, wherein the coupling lock means is locked;
   jack means for moving the coaxial sleeve and the first rod so as to compress the first spring and move the external piston to open the valve when the rod is in the first position;
   and second means for moving the first rod to a second position for uncoupling the coupling lock means from the external piston to thereby allow rapid closing of the valve by the first spring.

2. A high speed closing device, comprising:
   a frame defining an opening;
   a valve which longitudinally closes upon the frame;
   a housing secured to the frame within the opening;
   a hollow external piston integral with the valve and slideable within the housing;
   a first spring, located between the external piston and the housing, for applying a closing force to the external piston which tends to close the valve;

a hollow internal piston slideable within the external piston, said internal piston including a locking groove formed on its interior surface;

a second spring, located between an internal shoulder of the external piston and internal piston for providing relative biasing of the pistons;

a coaxial sleeve surrounding a first rod wherein said first rod is slideable within the coaxial sleeve;

a coupling lock means, connected to the first rod and cooperating with the locking groove, for selectively coupling the first rod to the internal piston when the rod is in a first position;

first means for moving the rod to the first position wherein the coupling lock means is locked;

jack means for moving the coaxial sleeve and therefore the internal piston will move so as to initially compress the second spring and subsequently move the external piston to open the valve when said rod is in the first position; and second means for moving the first rod to a second position for uncoupling the coupling lock means from the internal piston to allow closing of the valve by the first spring.

3. The closing device of claim 2 wherein:

said coupling lock means comprises a pair of generally V-shaped cams, one end of each respective cams being pivotally attached to the end of the first rod, wherein said cams pivot into and out of engagement with the locking groove, the free ends of said cams being respectively coupled to a pair of first ends of pivotable bar-shaped members, second ends of said bar-shaped members being pivotably connected to a cylinder means integral with said coaxial sleeve, wherein movement of said members along the longitudinal axis of said rod will cause the cams to pivot and uncouple the coupling lock means from the internal piston.

4. The closing device of claim 2 wherein said first means is a solenoid and wherein said second means is a tension spring.

5. The closing device of claim 2 wherein said closing device includes safety means including:

a sleeve integral with the housing and surrounding a portion of the external piston;

a return lock means connected to the external piston and engaging an end of the sleeve when the valve is closed, thereby preventing the unintentional opening of the valve, a shoulder on the exterior of in the internal piston which engages said return lock means to release the return lock means from engagement with the end of the sleeve to allow the valve to open.

6. The closing device of claim 5 wherein the return lock means comprises a pair of pivoting cams which hook over the end of the sleeve when the external piston is closed.

* * * * *